US006845023B2

(12) United States Patent
Philips et al.

(10) Patent No.: US 6,845,023 B2
(45) Date of Patent: Jan. 18, 2005

(54) UNIVERSAL ADAPTER WITH INTERCHANGEABLE PLUGS

(75) Inventors: Robert P. Philips, Waterloo (CA); Daniel Fischer, Waterloo (CA); Steven Fyke, Fort Erie (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 10/453,353

(22) Filed: Jun. 3, 2003

(65) Prior Publication Data

US 2003/0211767 A1 Nov. 13, 2003

Related U.S. Application Data

(62) Division of application No. 09/799,651, filed on Mar. 6, 2001, now Pat. No. 6,669,495.
(60) Provisional application No. 60/246,127, filed on Nov. 6, 2000.

(51) Int. Cl.[7] .............................................. H02M 3/335
(52) U.S. Cl. ........................... 363/132; 363/17; 363/95
(58) Field of Search ............................. 363/17, 95, 98, 363/132

(56) References Cited

U.S. PATENT DOCUMENTS

| | | | | | |
|---|---|---|---|---|---|
| 4,001,665 | A | * | 1/1977 | Wisner et al. | 363/93 |
| 4,502,104 | A | * | 2/1985 | Mitchell | 363/26 |
| 5,613,863 | A | | 3/1997 | Klaus et al. | |
| 5,634,806 | A | | 6/1997 | Hahn | |
| 5,684,689 | A | | 11/1997 | Hahn | |
| 5,791,921 | A | | 8/1998 | Lee | |
| 5,934,921 | A | | 8/1999 | Doong | |
| 6,039,608 | A | | 3/2000 | Amero, Jr. et al. | |
| 6,086,395 | A | | 7/2000 | Lloyd et al. | |
| 6,109,977 | A | | 8/2000 | Baxter et al. | |
| 6,328,581 | B1 | | 12/2001 | Lee et al. | |
| 6,664,762 | B2 | * | 12/2003 | Kutkut | 320/116 |

* cited by examiner

*Primary Examiner*—Bao Q. Vu
(74) *Attorney, Agent, or Firm*—Jones Day; Krishna K. Pathiyal; Robert C. Liang

(57) ABSTRACT

A universal adapter for use with a rechargeable handheld communication device includes a power module. An AC rectifier is operable to convert an AC power signal into a rectified AC power signal. A DC transformer is operable to receive the AC rectified power signal and output a DC transformed power signal. A top switch feedback circuit is coupled to the DC transformer and is operable to regulate the DC transformed power signal. A DC to DC switching converter is coupled to the DC transformer and is operable to convert the DC transformed power signal to a converted DC power signal. A feedback control circuit is coupled to the DC to DC converter and operable to regulate the converted DC signal.

8 Claims, 7 Drawing Sheets

UNIVERSAL ADAPTER WITH INTERCHANGEABLE PLUGS

This application is a divisional of application Ser. No. 09/799,651, filed Mar. 6, 2001, now U.S. Pat. No. 6,669,495, which claims the benefit of U.S. Provisional Application No. 60/246,127, filed Nov. 6, 2000, the entire disclosures of which are incorporated herein by reference.

FIELD OF THE INVENTION

The present invention is directed to the field of electrical adaptors, particularly those of the type for use in different countries.

BACKGROUND

Wall socket types can vary from country to country and from place to place. The plugs that must mate with the wall socket must vary according to the wall socket type. In addition, current, voltage, et cetera can also vary as geographic location is varied. A traveler can carry electric and electronic devices with them during their travels. It is therefore sometimes desirable for the traveler to use local sources of electricity. In order for the traveler to use these local electricity sources, they must adapt to, among other things, the configuration of the wall socket. A universal adaptor may be employed for this purpose.

Generally, universal adaptors include prongs that fold into an adaptor base. Adaptor plugs are fitted over the prongs thereby allowing the universal adaptor to mate with a wall socket. The type of adaptor plug is selected to mate with the desired configuration of wall socket.

SUMMARY OF THE INVENTION

The present invention provides an electrical adaptor apparatus for use with an electrical device including a case defining a socket. The socket has a plurality of first electrical contacts. The apparatus also includes a plurality of adaptor plugs. Each adaptor plug has a plurality of recessed second electrical contacts configured to communicate with a corresponding one of the first electrical contacts. Each adaptor plug is configured to mate with the socket. Each adaptor plug is further configured to mate with a style of electrical wall socket. The apparatus further includes a locking mechanism operative to lock the adaptor plug into the socket. The apparatus includes a detent button that is operative to release the locking mechanism, thereby to release the adaptor plug from the socket.

The present invention also provides an apparatus for use with an electrical device including a case defining a socket. The socket has a plurality of first electrical contacts. The apparatus also includes a plurality of adaptor plugs. Each adaptor plug has a plurality of recessed second electrical contacts configured to communicate with a corresponding one of the first electrical contacts. Each adaptor plug is configured to mate with the socket. Each adaptor plug is further configured to mate with a style of electrical wall socket. The apparatus further includes a locking mechanism operative to lock the adaptor plug into the socket. The apparatus includes a detent button that is operative to release the locking mechanism, thereby to release the adaptor plug from the socket. The apparatus further includes a power converter module.

The power converter module includes: a fuse, an input source, an electrical filter, a direct current (DC) transformer, a top switch feedback-loop, and an output-rectified filter.

The module further includes a DC-DC converter, an output filter, an output, and a voltage and current feedback controller.

The universal adaptor is particularly useful for recharging handheld electronic devices. Examples of such devices include data and communication devices.

DESCRIPTION OF PREFERRED EMBODIMENTS

Figure 1:
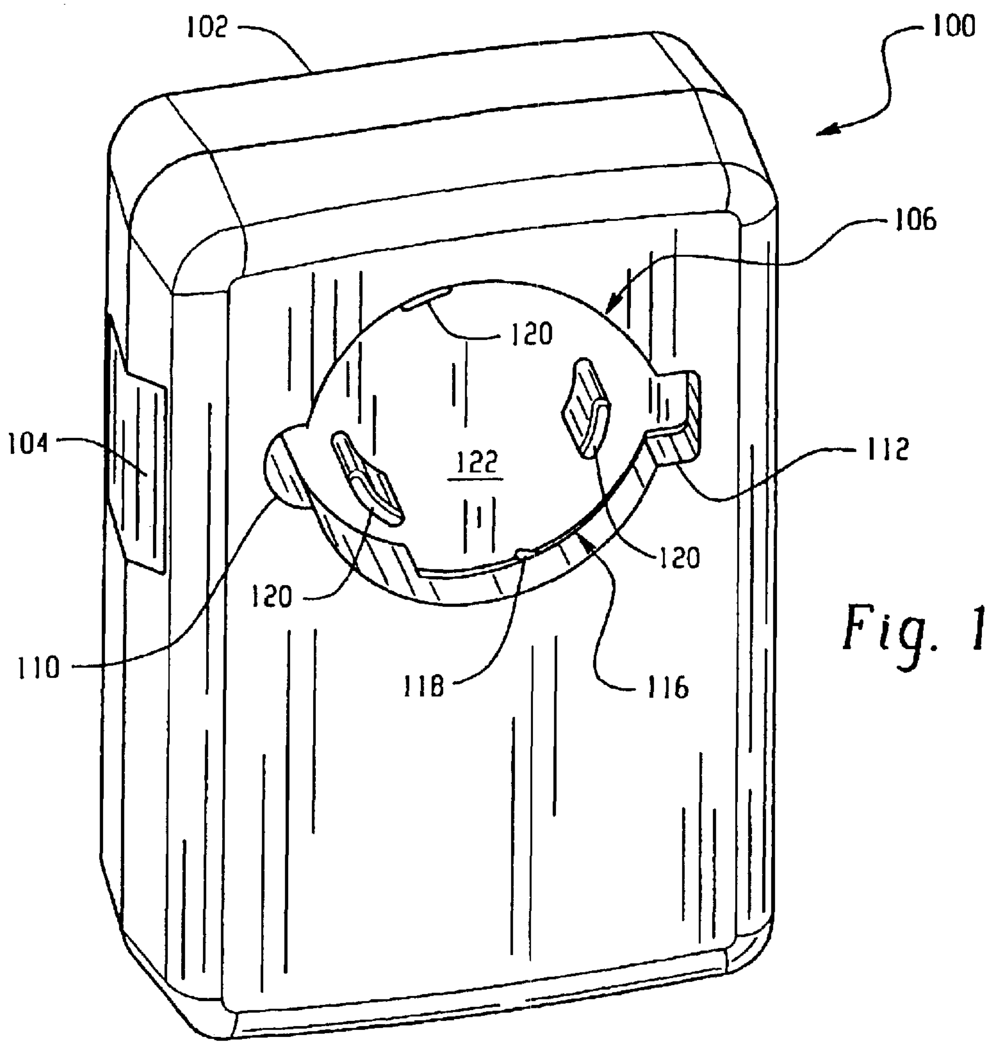
FIG. 1 is a perspective view comprising a first embodiment of the invention without an adaptor plug for clarity of presentation.

An apparatus 100 comprising a first embodiment of the invention is shown in FIG. 1. The apparatus 100 is a universal adaptor for electric wall sockets.

The apparatus 100 includes a case 102. The case 102 has a detent button 104 along one side. The front of the case 102 defines a generally circular shaped socket 106. The edge of the socket 106 has a first and a second notch, 110 and 112 respectively. The first notch 110 is shaped as a half circle. The second notch 112 is shaped as a rectangle. The inner portion of the side of the socket 106 has a first and second groove, 114 and 116 respectively. Only the second groove 116 is visible in FIG. 1. The first groove 114 extends along the side of the socket 106 from the first notch 110. The second groove 116 extends along the side of the socket 106 from the second notch 112. A latch 118 is located in the second groove 116.

A circular array of three electrical contacts 120 is arranged in the socket 106. The contacts 120 are equidistant from the inside edge of the socket 106 and extend out from the bottom 122 of the socket 106.

Figure 2:
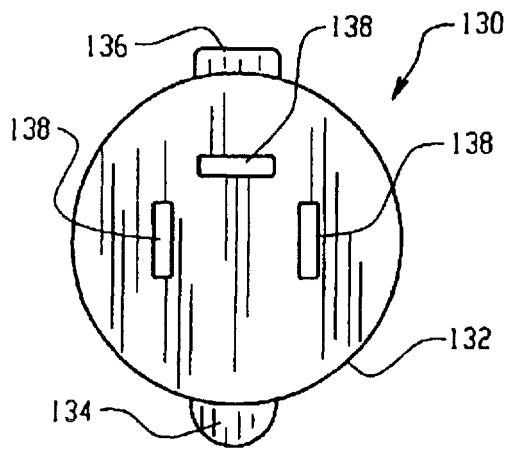
FIG. 2 is a schematic front view of a type D style adaptor plug of the invention.

FIG. 2 is a front view of an adaptor plug 130. The adaptor plug 130 has an adaptor body 132 configured to mate with the socket 106. The adaptor body 132 has a first and a second protrusion, 134 and 136 respectively. The first protrusion 134 is has the shape of a flat half circle and is configured to engage with the first notch 110. The second protrusion 136 has the shape of a flat rectangle and is configured to engage the second notch 112. Both the first and second protrusions, 134 and 136, are configured to slidably engage the first and the second groove, 114 and 116, respectively. Further, the first and second protrusions, 134 and 136, are configured so that they cannot engage the first and second notches, 110 and 112, in any reverse order. For example, the first protrusion 134 cannot fit into the second notch 112. Alternate embodiments include multiple notches that respectively mate with multiple protrusions. The adaptor plug 130 includes three wall socket prongs 138. The three plugs 138 extend out from the front the adaptor body 132.

Figure 3:
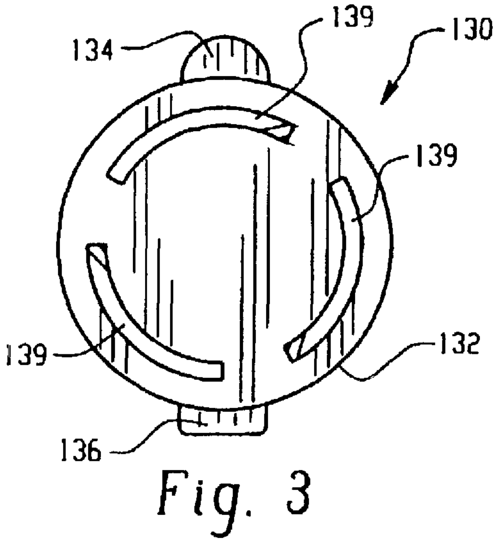
FIG. 3 is a schematic rear view of the adaptor plug shown in FIG. 2.

FIG. 3 is a rear view of the adaptor plug 130 shown in FIG. 2. The adaptor plug 130 has three receiving slots 139 in the rear of the adaptor body 132. The receiving slots 139 are each configured to slidably receive a corresponding one of the three electrical contacts 120.

Figure 4:
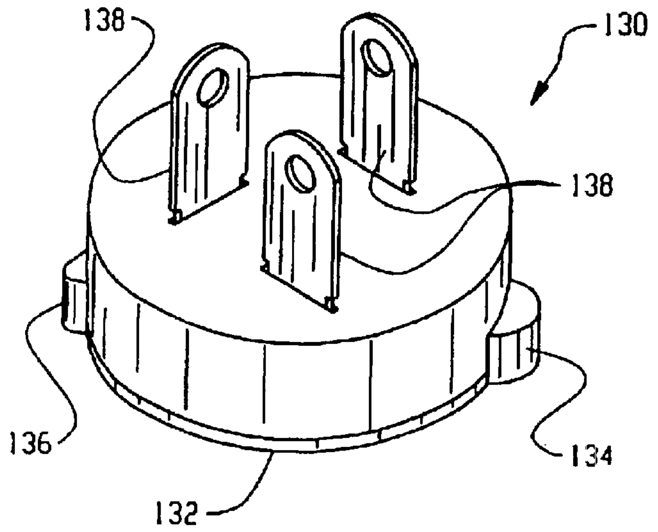
FIG. 4 is a perspective view of the adaptor plug shown in FIG. 2.
Figure 5:
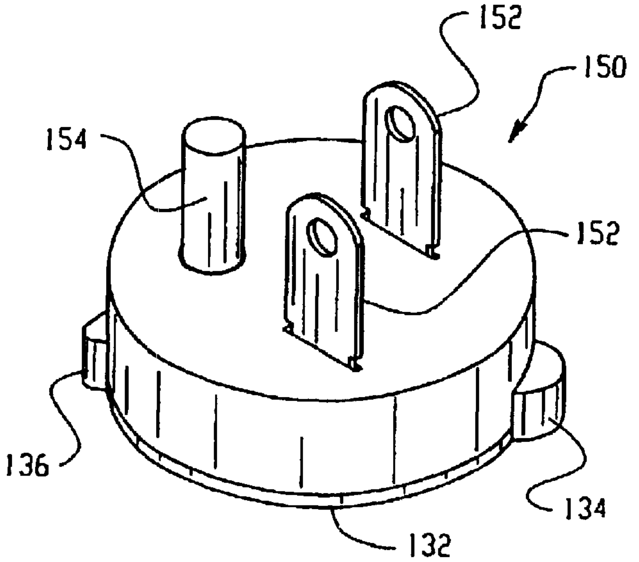
FIG. 5 is a perspective view of a type N style of an adaptor plug of the invention.
Figure 6:
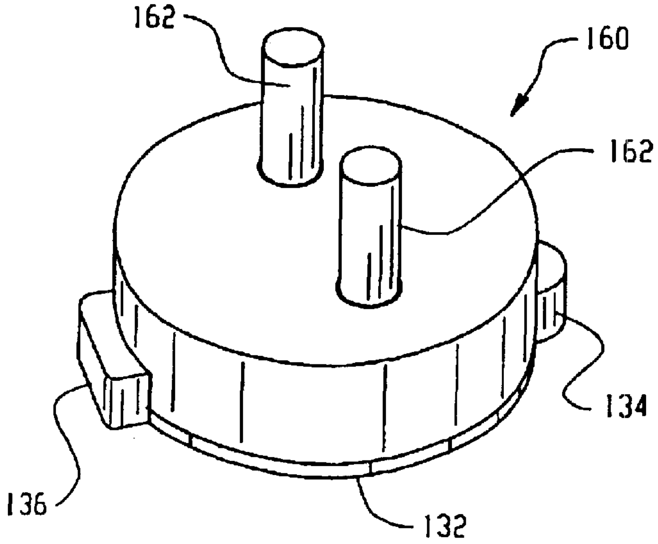
FIG. 6 is a perspective view of a type B style of an adaptor plug of the invention.

FIGS. 4 through 6 show perspective views of exemplary adaptor plugs that are interchangeable and can be engaged with the socket 106. Specifically, FIG. 4 shows a perspective view of the adaptor plug 130 shown in FIGS. 2 and 3. The adaptor plug 130 has three wall socket prongs 138 for use in United Kingdom style wall sockets found in the United Kingdom and the like. It is also for use with wall sockets configured to receive type D plugs.

FIG. 5 shows an adaptor plug 150. The adaptor plug 150 has prongs 152 for use in North American style wall sockets found in North America and the like. It is also for use with wall sockets configured to receive type N plugs. The adaptor plug 150 also has a grounding post 154. FIG. 6 shows an adaptor plug 160. The adaptor plug 160 has prongs 162 for use in European style wall sockets found in Europe and the like. It is also for use with wall sockets configured to receive type B plugs. Adaptor plugs of FIGS. 5 and 6 have many parts that are substantially the same as corresponding parts of the adaptor plug 130 shown in FIGS. 2 through 3. However, the adaptor plugs of FIGS. 5 and 6 differ from the adaptor plug 130 in that they are configured to mate with wall sockets having different configurations than the United Kingdom style wall sockets found in the United Kingdom and the like.

Figure 7:
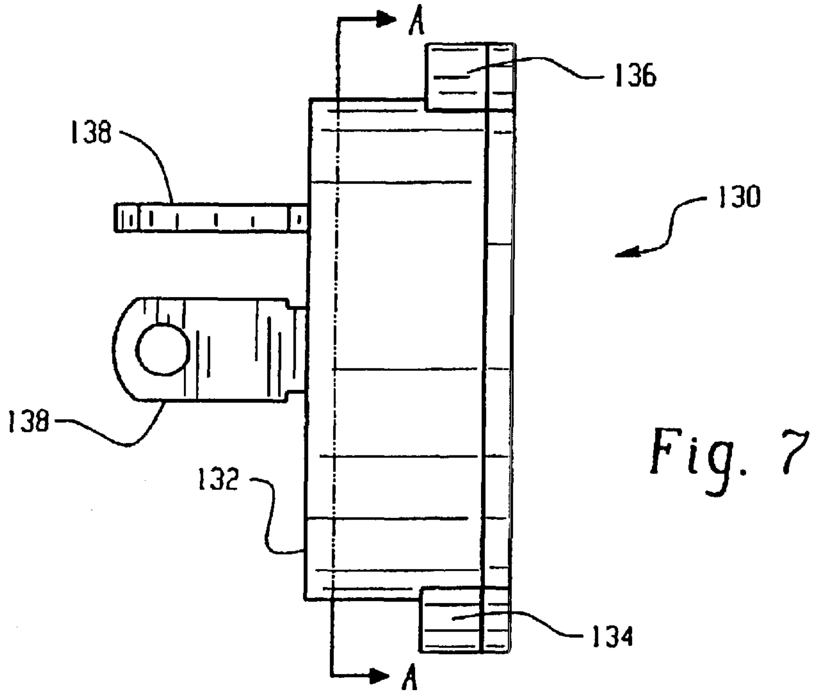
FIG. 7 is a schematic side view of the adaptor plug shown in FIG. 2.
Figure 8:
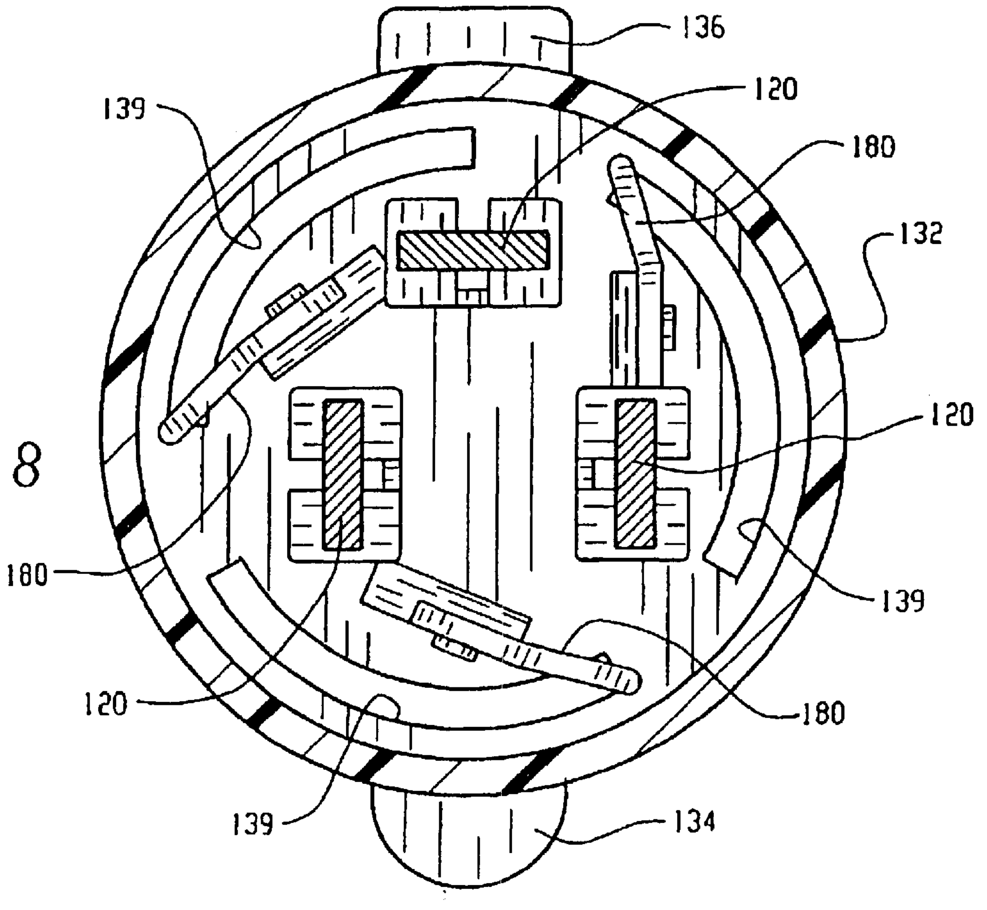
FIG. 8 is a schematic view of the adaptor plug shown in FIG. 7 along the line A—A.

FIG. 7 shows a side view of the adaptor plug 130 shown in FIG. 2. FIG. 8 shows a view of the adaptor plug 130 shown in FIG. 7 along the line A—A. The receiving slots 139 are visible in the cutaway view shown in FIG. 8. A corresponding electrical contact 180 is disposed over each end of one of the receiving slots 139. Each of the three electrical contacts 180 are configured to make an electrical connection with a corresponding one of the three electrical contacts 120 when the adaptor plug 130 is fully engaged in the socket 106. Each electrical contact 120 is in electrical communication with a corresponding one of the three wall socket prongs 138.

Figure 9:
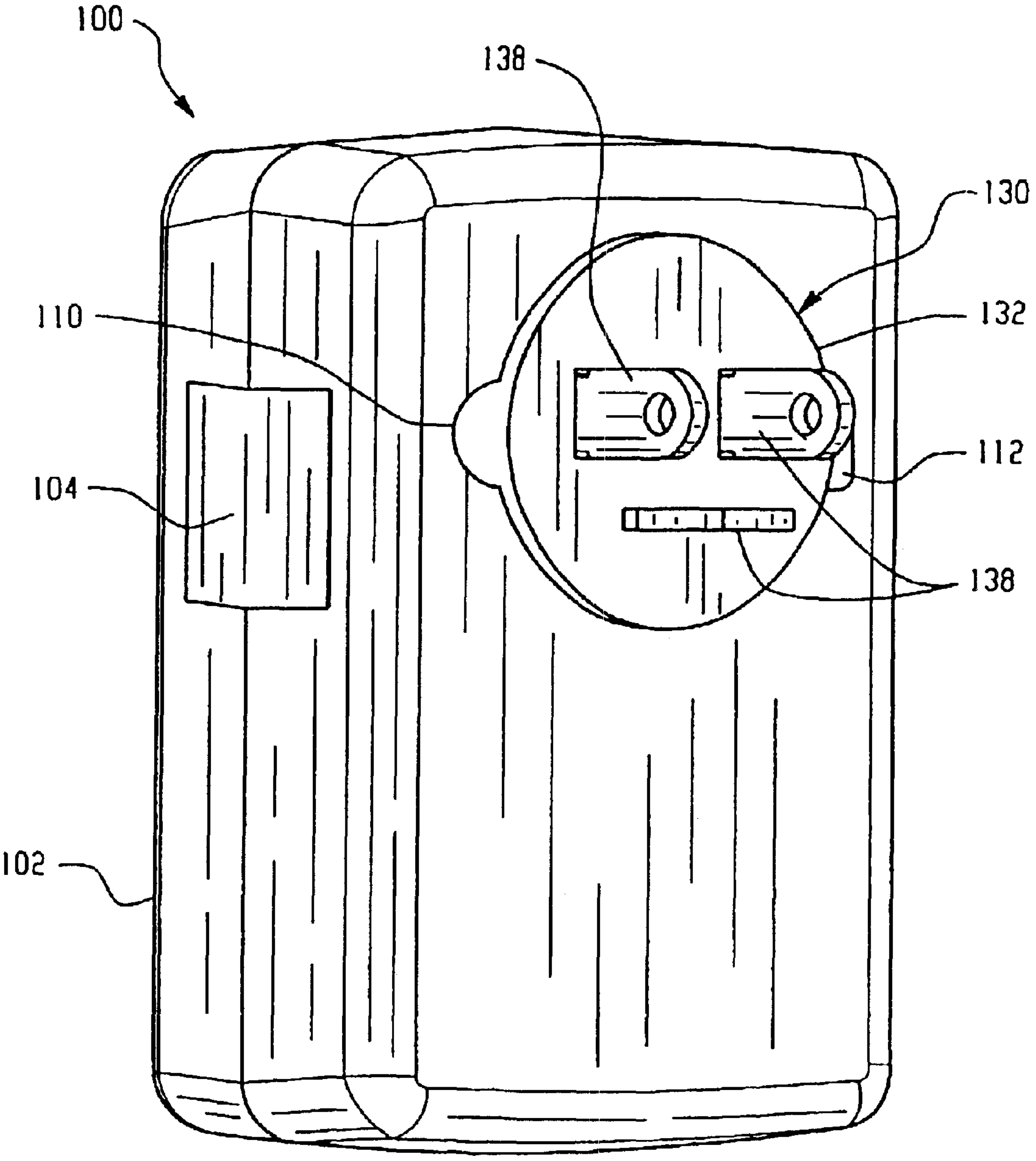
FIG. 9 is a perspective view of the embodiment shown in FIG. 1 with the adaptor plug shown in FIG. 2 assembled in the socket.

FIG. 9 shows the apparatus 100 assembled with the adaptor plug 130. The adaptor plug 130 engages the apparatus 100 as shown.

Figure 11:
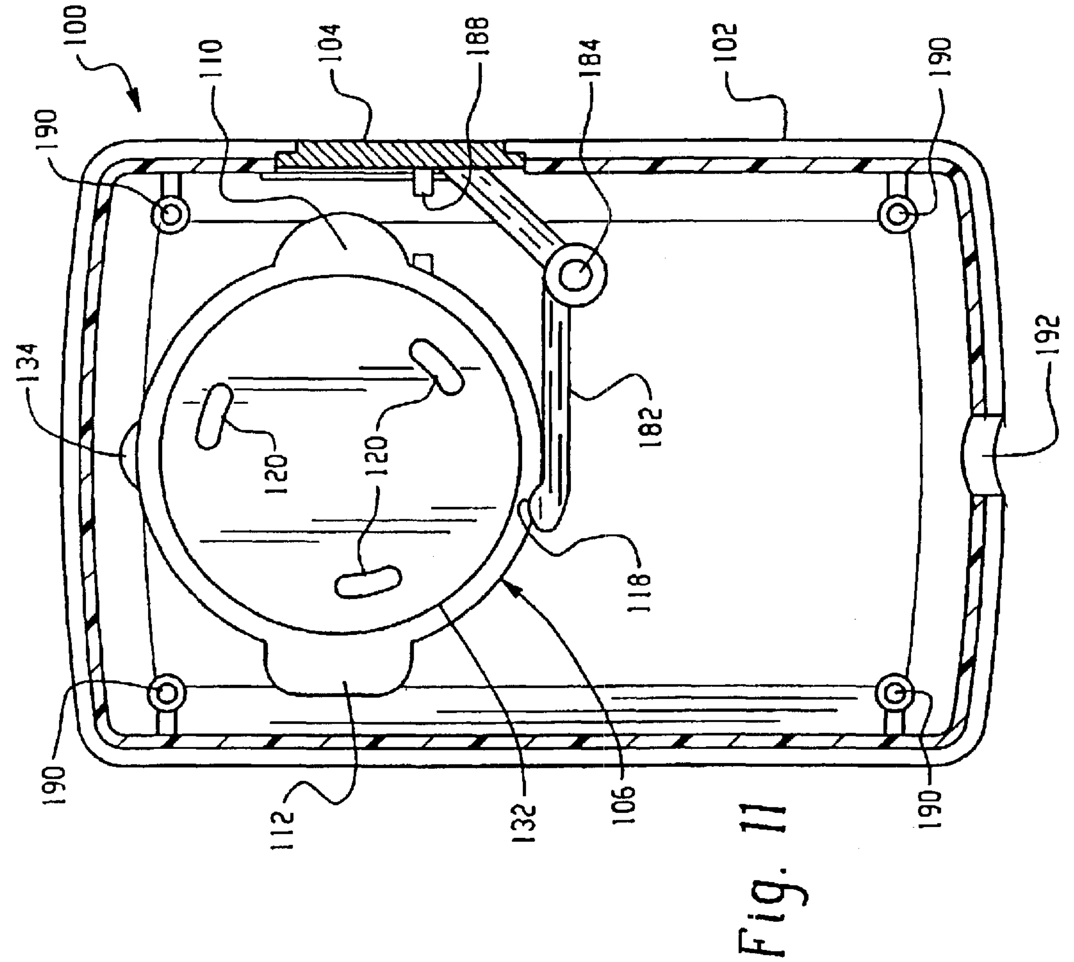
FIG. 11 is a schematic view of the embodiment shown in FIG. 10 along the line B—B.
Figure 10:
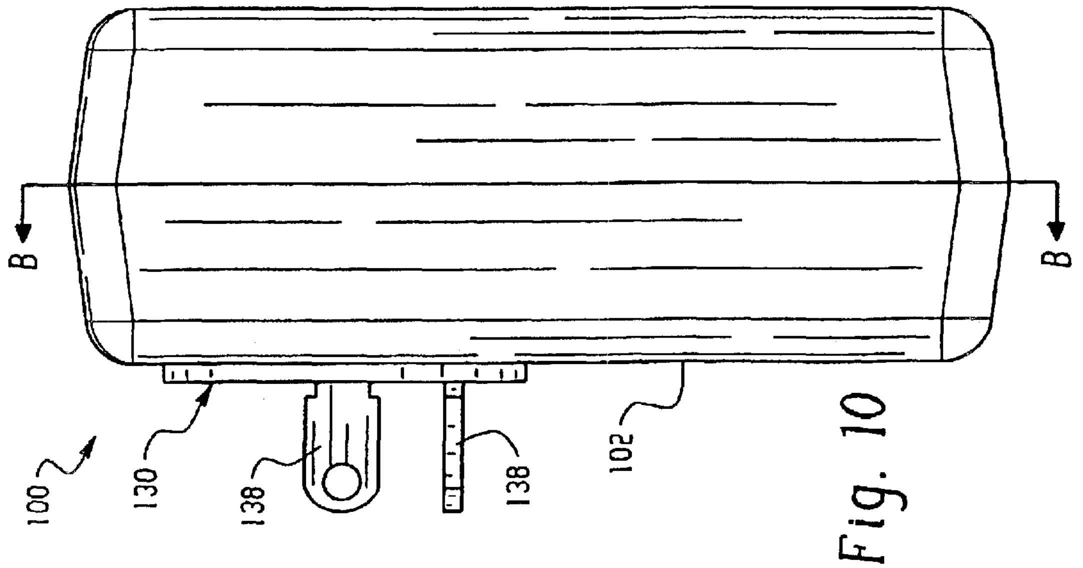
FIG. 10 is a side view of the embodiment of the invention shown in FIG. 9.

A side view of the apparatus 100 assembled with the adaptor plug 130 engaged in the socket 106 is shown in FIG. 10. FIG. 11 shows a cutaway view of the apparatus 100 of FIG. 10 along the line B—B. The detent button 104 is on the side of the case 102 and couples with the lever 182. The lever 182 is configured to pivot around a pivot structure 184. The lever 182 has a catch 186 that is configured to engage the adaptor body 132. A linear spring 188 biases the lever 182 against the detent button 104. FIG. 11 also shows the fasteners 190 that are configured to attach the front and back portions of the case 102 together. An electrical outlet 192 is located at the bottom of the case 102.

During use, one of the adaptor plugs of the present invention, for example the adaptor plug 130, is oriented with the socket 106. The first protrusion 134, which has the shape of a flat half circle, is oriented with the first notch 110. The second protrusion 136, which has the shape of a flat rectangle, is oriented with the second notch 112. The adaptor plug 130 is then inserted into the socket 106 until it is seated at the bottom 122 of the socket 106. The electrical contacts 120, which extend out from the bottom 122 of the socket 106, protrude through the receiving slots 139. The adaptor plug 130 is then turned approximately one quarter of its circumference. The turning slides the first and the second protrusions, 134 and 136, along the first and the second grooves, 114 and 116, respectively. The lever 182 engages the adaptor body 132 when the first and the second protrusions, 134 and 136, are moved to the end of the first and the second grooves, 114 and 116, thereby releasably locking the adaptor plug 130 into place in the socket 106.

Figure 12:
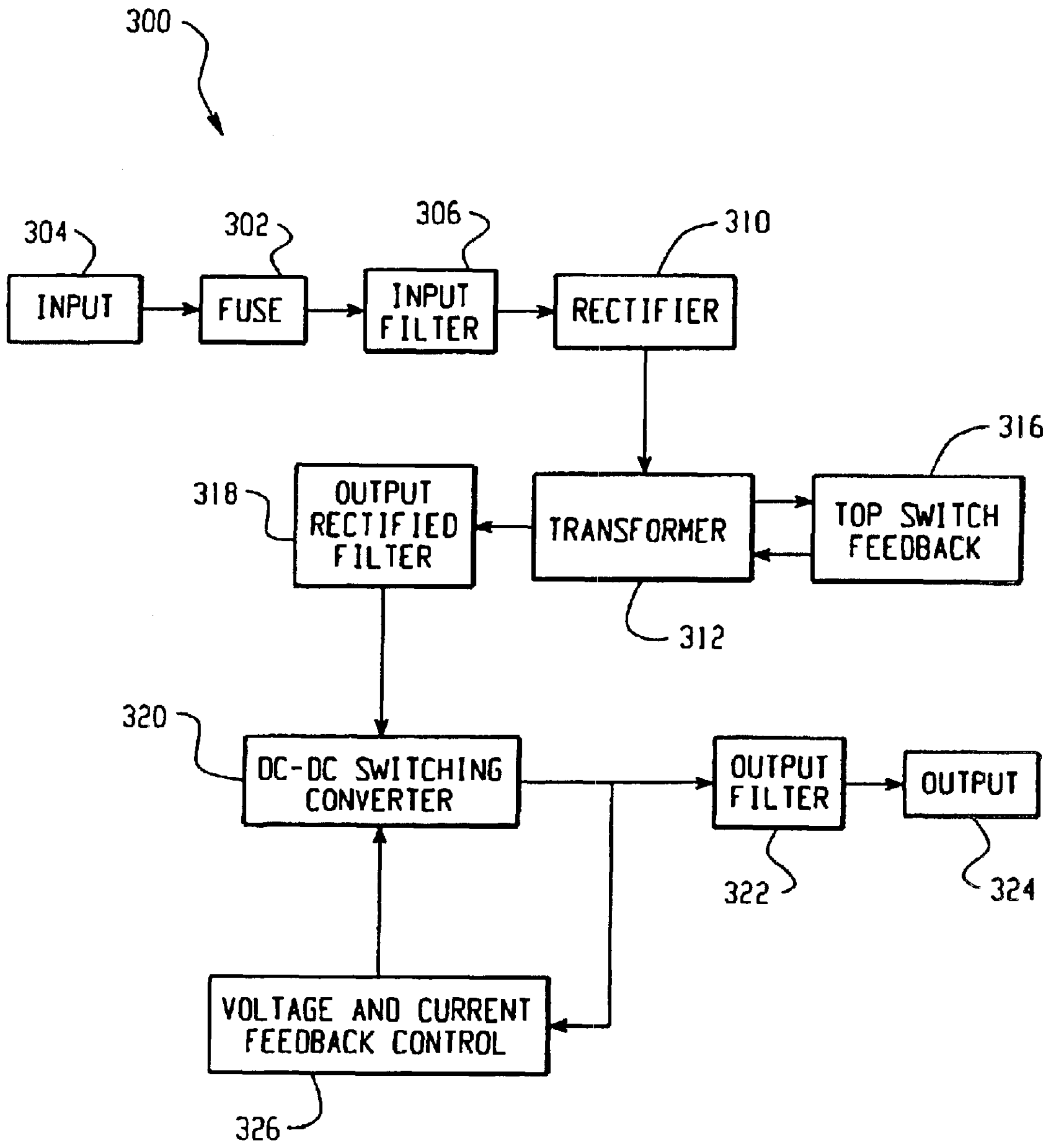
FIG. 12 is a block diagram of the electronic system of the invention.

FIG. 12 shows an electrical block diagram 300 of the apparatus 100. A fuse 302 is situated between, and is in electrical communication with, an input voltage source 304 and an electrical filter 306. A rectifier 310 couples the electrical filter 306 to a direct current (DC) transformer 312. The DC transformer 312 couples a top switch feedback-loop 316 and an output-rectified filter 318. The output-rectified filter 318 couples to a DC-DC converter 320 which, in turn, couples to an output filter 322. The outlet filter 322 couples with an output 324. A voltage and current feedback controller 326 couples to the DC-DC converter 320.

During operation, an alternating electrical current (AC) is supplied to the apparatus 100 from the input source 304. Generally, this is achieved by plugging the assembled apparatus 100 into a wall socket. The fuse 302 protects the apparatus 100 from electrical surges from the input source 304. The filter 306 cleans the input electrical signal. The rectifier 310 converts the AC current signal to a substantially DC current signal. The signal is then converted from a high voltage low current signal to a lower voltage higher current signal by a DC transformer 312. The top switch feedback-loop 316 maintains the DC voltage output from the transformer 312 within a constant range of voltage. The output-rectified filter 318 separates any noise from the low voltage, high current DC signal that may have been generated by the DC transformer 312. The DC-DC converter 320 converts the low voltage, high current DC signal to a lower voltage signal. This lower voltage signal is passed through the output filter 322. The output filter 322 filters noise from the lower voltage signal and passes the lower voltage signal to the output 324. The voltage and current feedback controller 326 maintains a constant current and regulates the output voltage.

The electrical output from the apparatus 100 is used to recharge batteries or provide power in real time to an electronic device. Examples of such electronic devices include cellular phones, digital wireless phones, 1-way pagers, 1½-way pagers, 2-way pagers, electronic mail appliances, internet appliances, personal digital assistants (PDA), laptop computers, and portable digital audio players.

Figure 13:
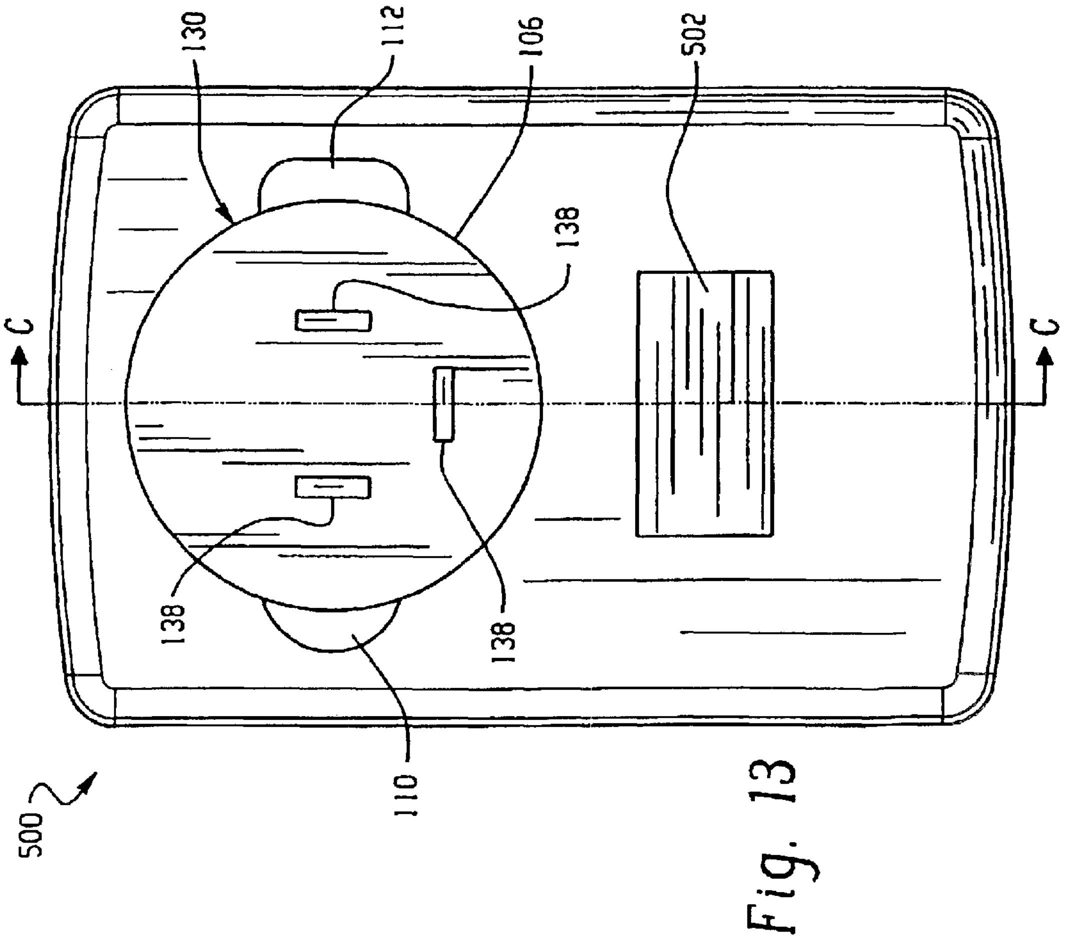
FIG. 13 is a schematic front view comprising a second embodiment of the invention.

An apparatus 500 comprising a second embodiment of the invention is shown in FIG. 13. The apparatus 500 has many parts that are substantially the same as corresponding parts of the apparatus 100 described above. This is indicated by the use of the same reference numbers for such corresponding parts in FIG. 1 and FIG. 13. However, the apparatus 500 has a detent button 502, similar to the detent button 104, but located on the front face of the case 102. The location of the detent button 502 on the front face of the case 102 result in the detent button 502 not being accessible while the apparatus 500 is electrically connected with a wall socket, (i.e., plugged into the wall socket).

Figure 14:
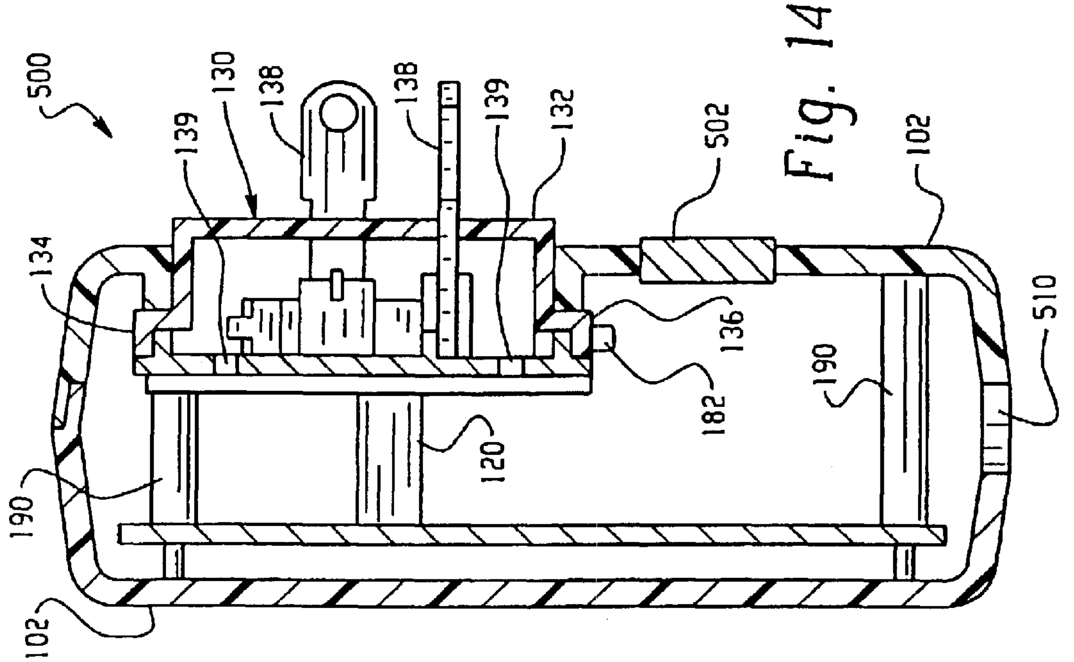
FIG. 14 is a side view of the embodiment shown in FIG. 13 along the line C—C.

FIG. 14 is a cutaway view of the apparatus 500 of FIG. 13 along the line C—C. An electrical plug outlet 510 is located at the bottom of the case 102. The outlet 502 is configured to communicate with a cable, not shown. In turn, the cable allows the apparatus 500 to communicate with a handheld device, thus providing the device with a supply of power.

As will be appreciated, the invention is capable of other and different embodiments and its several embodiments are capable of modifications in various respects, all without departing from the invention. Accordingly, the drawings and description are to be regarded as illustrative in nature and not restrictive.

What is claimed is:

1. A universal adapter for use with a rechargeable handheld communication device, the universal adapter including a power module comprising:

a rectifier circuit operable to convert an AC power signal into a rectified power signal;

a DC transformer circuit operable to receive the rectified power signal and output a DC transformed power signal;

a top switch feedback loop circuit coupled to the DC transformer circuit and operable to regulate the DC transformed power signal;

a DC to DC switching converter circuit coupled to the DC transformer circuit and operable to convert the DC transformed power signal to a converted DC power signal; and a feedback control circuit coupled to the DC to DC converter circuit and operable to regulate the converted DC signal;

and further comprising:

a) a case defining a socket and a button opening, the socket having a plurality of first electrical contacts, the socket defining a first notch and a first groove extending along a first side of the socket from the first notch;

b) a plurality of adapter plugs, i. each adapter plug having a plurality of recessed second electrical contacts configured to communicate with a corresponding one of the first electrical contacts;

ii. each adapter plug having a first protrusion;

iii. each adapter plug configured to mate with the socket by inserting the first protrusion into the first notch and turning the adapter plug to slidably engage the first protrusion with the first groove; and iv. each adapter plug further configured to mate with a style of electrical wall socket;

c) a locking mechanism operative to lock the adapter plug into the socket; and d) a detent button located in the button opening operative to release the locking mechanism, thereby to release the adapter plug from the socket.

2. The universal adapter of claim 1, wherein the socket further defines a second notch and a second groove extending along a second side of the socket from the second notch, and wherein each adapter plug further has a second protrusion, and each adapter plug is further configured to mate with the socket by inserting the second protrusion into the second notch and turning the adapter plug to slidably engage the second protrusion with the second groove.

3. The universal adapter of claim 1, wherein the case defines a first side in which the socket is disposed, and wherein the button opening is disposed on the first side.

4. The universal adapter of claim 1, wherein the case defines a first side and a second side, the first side in which the socket is disposed and the second side opposite the first side, and wherein the button opening is disposed on the second side.

5. The universal adapter of claim 1, further comprising an electrical output port operable to receive the converted DC power signal and further operable to provide the converted DC power signal to a mobile communication device via a power coupling.

6. The universal adapter of claim 5, wherein the power coupling is a power cable.

7. The universal adapter of claim 1, wherein the feedback control circuit is a voltage and current feedback control circuit.

8. A method of converting a power signal in an adapter, comprising:

rectifying an AC power signal to create a rectified AC power signal;

transforming the rectified AC power signal into a DC transformed power signal;

providing top switch feedback to regulate the DC transformed power signal;

converting the DC transformed power signal into a converted DC power signal;

providing feedback control to regulate the converted DC power signal;

providing an adapter having a plurality of adapter plugs, each plug of the plurality of adapter plugs configured to couple to a different style of electrical wall outlet;

selecting one plug of the plurality of adapter plugs that is configured to mate with a desired electrical wall outlet style; and locking the one plug into the adapter by inserting a protrusion on the one plug into a notched opening in the adapter and turning the one plug so that the protrusion slidably engages a groove extending from the notched opening, thereby to configure the adapter to couple to the desired electrical wall outlet and provide power to the handheld electronic device.

* * * * *